United States Patent
Chu et al.

(10) Patent No.: US 12,437,244 B2
(45) Date of Patent: Oct. 7, 2025

(54) SYSTEM AND METHOD FOR RESERVING CLOUD-BASED INSTRUMENT

(71) Applicant: ADVANTEST CORPORATION, Tokyo (JP)

(72) Inventors: Fang-min Chu, Shanghai (CN); Lei Liu, Shanghai (CN)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 18/525,900

(22) Filed: Dec. 1, 2023

(65) Prior Publication Data

US 2024/0104443 A1 Mar. 28, 2024

Related U.S. Application Data

(63) Continuation of application No. PCT/CN2022/097691, filed on Jun. 8, 2022.

(30) Foreign Application Priority Data

Aug. 24, 2021 (CN) .......................... 202110974624.3

(51) Int. Cl.
*G06Q 10/02* (2012.01)

(52) U.S. Cl.
CPC ................... *G06Q 10/02* (2013.01)

(58) Field of Classification Search
CPC .................................................. G06Q 10/02
(Continued)

(56) References Cited

U.S. PATENT DOCUMENTS

| 2004/0121299 A1* | 6/2004 | Rougeau | G09B 5/06 |
| | | | 434/365 |
| 2005/0080745 A1* | 4/2005 | Hayhow | G06Q 99/00 |
| | | | 705/59 |

(Continued)

FOREIGN PATENT DOCUMENTS

| CN | 1694571 A | 11/2005 |
| CN | 106909131 A | 6/2017 |

(Continued)

OTHER PUBLICATIONS

L. Toderick, T. Mohammed and M. H. N. Tabrizi, "A Reservation and Equipment Management System for Secure Hands-on Remote Labs for Information Technology Students," Proceedings Frontiers in Education 35th Annual Conference, Indianapolis, IN, USA, 2005, pp. S3F-S3F. (Year: 2005).*

(Continued)

*Primary Examiner* — Jeff Zimmerman
*Assistant Examiner* — Hunter Molnar

(57) ABSTRACT

A method for reserving a cloud-based instrument and adapted to a system for reserving an instrument is provided. The system includes a group of remote instruments with a plurality of remote instruments, a system for reserving an instrument, and a bastion server. The reservation information includes a plurality of reservable time periods and a plurality of reserved time periods. The method for reserving the cloud-based instrument includes: establishing a secure connection between the bastion server and the remote instrument designated in any one of the reserved time periods, establishing a dedicated connection between the designated remote instrument and a user workstation designated in any one of the reserved time periods at start of any one of the reserved time periods according to pairing information and the reservation information, and terminating the secure (Continued)

connection and the dedicated connection at end of any one of the reserved time periods.

8 Claims, 2 Drawing Sheets

(58) Field of Classification Search
 USPC ............................................................ 705/5
 See application file for complete search history.

(56) References Cited

U.S. PATENT DOCUMENTS

| | | |
|---|---|---|
| 2005/0223232 A1 | 10/2005 | Anderson et al. |
| 2007/0005505 A1 | 1/2007 | D'Alo et al. |
| 2009/0216598 A1 | 8/2009 | Hamling |
| 2009/0248186 A1 | 10/2009 | Hamling |
| 2009/0249069 A1* | 10/2009 | Daskalopoulos ... H04L 63/0869 |
| | | 713/169 |
| 2011/0219123 A1* | 9/2011 | Yang ....................... H04L 67/14 |
| | | 709/227 |
| 2012/0197582 A1 | 8/2012 | Richardson |
| 2015/0365512 A1 | 12/2015 | MacKenzie et al. |
| 2017/0345325 A1* | 11/2017 | Metts ................. G09B 19/0069 |
| 2021/0075522 A1 | 3/2021 | Pettygrove et al. |

FOREIGN PATENT DOCUMENTS

| | | |
|---|---|---|
| CN | 107517246 A | 12/2017 |
| CN | 109739123 A | 5/2019 |
| CN | 111369743 A | 7/2020 |
| WO | WO-2020122700 A1 * | 6/2020 |

OTHER PUBLICATIONS

Zhang, Fei et al., "Development and application of the system of instrument reservation and information management for open instrument laboratory", Experimental Technology and Management, Jan. 2008, vol. 25, No. 1, pp. 83-86.

* cited by examiner

SYSTEM AND METHOD FOR RESERVING CLOUD-BASED INSTRUMENT

This application is a continuation of International Application No. PCT/CN2022/097691, filed on Jun. 8, 2022, which claims priority to Chinese Application No. 202110974624.3, filed on Aug. 24, 2021. The above-identified patent applications are incorporated herein by reference.

FIELD OF THE INVENTION

The present invention relates to a cloud-based instrument, and more particularly to a system and method for reserving a cloud-based instrument based on an instrument reservation system and a cloud-based authorization server.

BACKGROUND OF THE INVENTION

Generally, when a fabless semiconductor company wants to test a chip, it needs to find and rent an instrument that meets the company's product testing requirements, and then go to the location where the instrument is located for testing the product. However, if there is a shortage of instruments that meet the company's product testing requirements, or if the instruments lack a specific level of speed license, or if the laboratory is far away from the company, all of these factors will significantly increase the company's testing costs, testing uncertainty, and even affect or extend the time for product launching thereby missing business opportunities, resulting in a great loss to the company.

SUMMARY OF THE INVENTION

In view of this, an embodiment of the present invention provides a system for reserving a cloud-based instrument, which includes a group of remote instruments, an instrument reservation system, a bastion server, a group of user workstations, and a cloud-based authorization server. The group of remote instruments includes a plurality of remote instruments. The instrument reservation system is configured to provide reservation information and instrument information. The reservation information includes a plurality of reservable time periods and a plurality of reserved time periods, and each of the reserved time periods corresponds to one of the remote instruments. The bastion server is coupled to the group of remote instruments and configured to be paired with each of the remote instruments to generate pairing information. The group of user workstations is coupled to the bastion server and the instrument reservation system. The group of user workstations includes a plurality of user workstations. Any one of the user workstations selects one of the reservable time periods according to the reservation information and designates one of the remote instruments according to the instrument information through the instrument reservation system. The cloud-based authorization server is coupled to the bastion server and configured to generate a speed license at the start of any one of the reserved time periods according to the reservation information, the pairing information, and the instrument information, and transmit the speed license through the bastion server to the remote instrument designated in any one of the reserved time periods.

The present invention provides a method for reserving a cloud-based instrument applied to a system for reserving a cloud-based instrument. The system for reserving the cloud-based instrument includes a group of remote instruments with a plurality of remote instruments, an instrument reservation system, and a bastion server. The instrument reservation system is configured to provide reservation information and instrument information. The reservation information includes a plurality of reservable time periods and a plurality of reserved time periods. Each of the reserved time periods designates one of the remote instruments. The method for reserving the cloud-based instrument includes a step of: establishing, by the bastion server, a secure connection between the bastion server and the remote instrument designated in any one of the reserved time periods, establishing a dedicated connection between the designated remote instrument and a user workstation designated in any one of the reserved time periods at start of any one of the reserved time periods according to pairing information and the reservation information, and terminating the secure connection and the dedicated connection at end of any one of the reserved time periods.

Through the system and method for reserving the cloud-based instrument provided by an embodiment of the present invention, the user workstation can search, reserve, and select the remote instrument and the time period that meet the product testing requirements through the instrument reservation system, establish a dedicated connection between the user workstation and the designated remote instrument at the start of any one of the reserved time periods through the bastion server, the pairing information, and the reservation information, generate and transmit a specific speed license to the designated remote instrument at the start of any one of the reserved time periods through the cloud-based authorization server, the instrument information, and the reservation information, and then terminate the dedicated connection through the bastion server at the end of any one of the reserved time periods. Thus, the time for searching for the location of the remote instrument that meets the product testing requirements is greatly reduced, the security and exclusivity of a testing environment are ensured, the convenience of testing a product is enhanced, and the time for product launching is accelerated.

The above description is only an overview of the technical solution of the present invention and can be implemented according to the content of the specification in order to have a clearer understanding of the technical means of the present invention. Also to make the above and other objectives, features, and advantages of the present invention more obvious and understandable, the preferred embodiments are set forth in the following, and are explained in detail as follows in conjunction with the accompanying drawings.

DETAILED DESCRIPTION OF PREFERRED EMBODIMENTS

Figure 1:
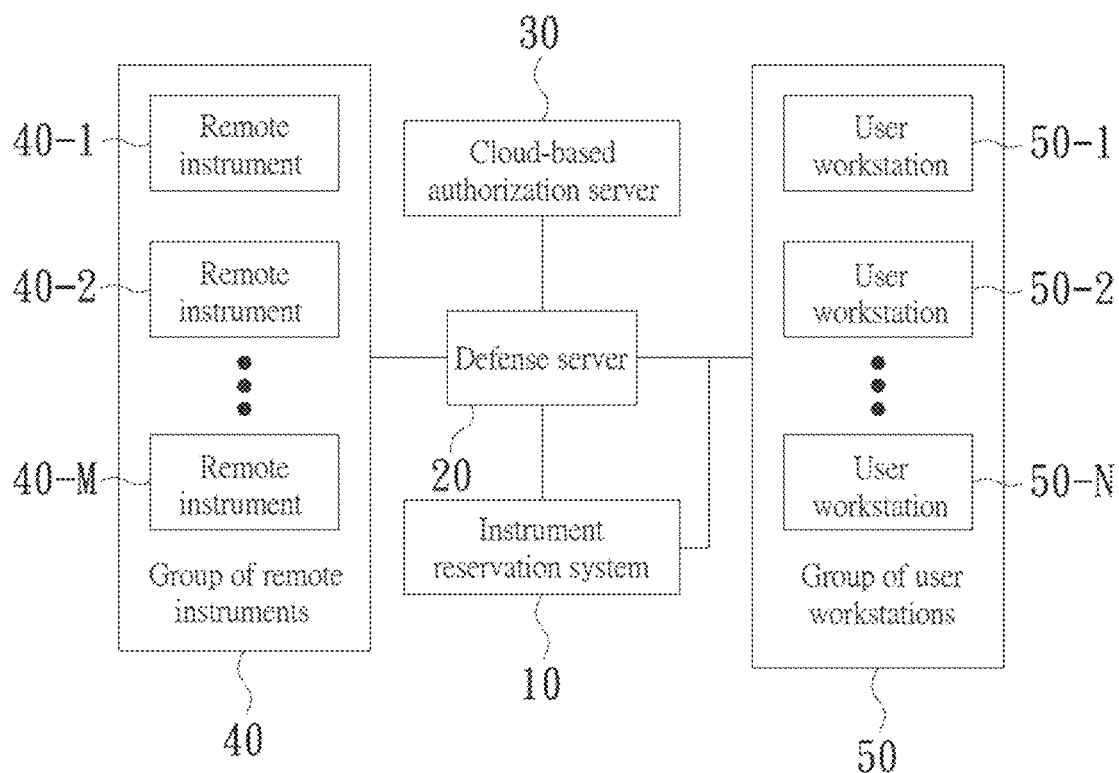
FIG. 1 is a schematic diagram of a system for reserving a cloud-based instrument provided by an embodiment of the present invention.

Referring to FIG. 1, FIG. 1 is a schematic diagram of a system for reserving a cloud-based instrument provided by an embodiment of the present invention. A system for reserving a cloud-based instrument 1 includes an instrument reservation system 10, a bastion server 20, a cloud-based authorization server 30, a group of remote instruments 40, and a group of user workstations 50.

The group of remote instruments 40 may consist of a plurality of different remote instrument suppliers to provide a plurality of remote instruments 40-1 to 40-M with different testing capabilities. Further, each of the remote instruments may be provided with a plurality of different testing modules (e.g., a testing module for a digital product, a testing module for an RF product, etc.) as required. Each of the testing modules may test a specific testing item. For example, the testing module for the RF product can have a testing item that complies with the specifications of Wi-Fi communication protocol, Bluetooth communication protocol, or NB-IoT communication protocol.

In addition, each of the testing modules may also be provided with a specific testing speed as required, e.g., a general testing speed (e.g., tens of Mbps), a medium testing speed (e.g., hundreds of Mbps), or the highest level testing speed (e.g., several Gbps). Therefore, each of the remote instruments has its instrument information that describes the testing item and the testing speed (i.e., the testing capability) that can be provided by this remote instrument. In an embodiment of the present invention, different levels of speed licenses are configured for the different testing speeds. For example, a general level of speed license provides and gives the general testing speed for the remote instrument, a medium level of speed license provides the medium testing speed for the remote instrument, and the highest level of speed license provides the highest testing speed for the remote instrument. It is worth noting that the speed license may be obtained through purchase or lease by the remote instrument supplier from the remote instrument manufacturer. In addition, if the remote instrument itself is not configured with the speed license, the remote instrument cannot enable the functionality of the testing module, that is, the user workstation is not able to test a product (e.g. a chip) with a remote instrument that is not configured with the speed license.

The group of user workstations 50 is coupled to the bastion server 20 and the instrument reservation system 10. The group of user workstations 50 may consist of a plurality of user workstations 50-1 to 50-N formed by a plurality of different integrated circuit (IC) design companies. In an embodiment of the present invention, the IC design company may purchase or lease a specific level of speed license from the remote instrument manufacturer to be applied to the selected, designated remote instrument and to give the selected, designated remote instrument the ability to have a specific level testing speed.

The instrument reservation system 10 is configured to provide reservation information and instrument information to the bastion server 20 and the cloud-based authorization server 30. The reservation information includes a plurality of reservable time periods and a plurality of reserved time periods (i.e., non-reservable time periods). Each of the reserved time periods corresponds to one of the remote instruments (i.e., one of the plurality of remote instruments 40-1 to 40-M) designated by the user workstation (i.e., one of the plurality of user workstations 50-1 to 50-N). For example, each reservable time period is allowed to be reserved by only one user workstation through the instrument reservation system 10. In addition, the user workstation, in addition to selecting the reservable time period, is required to select and designate a remote instrument that meets the product testing requirements to complete a reservation process.

The bastion server 20 is coupled to the group of remote instruments 40 and is configured to be paired with each of the remote instruments to generate pairing information and transmit the pairing information to the cloud-based authorization server 30. In an embodiment of the present invention, the bastion server 20 includes a plurality of sub-bastion servers (not shown). These sub-bastion servers correspond to the plurality of remote instruments 40-1 to 40-M respectively, that is, each of the remote instruments is paired with one of the specific or designated sub-bastion servers. Objects to which these sub-bastion servers are paired are not repeated. Because each of the remote instruments has a dedicated identifier and a dedicated pairing password (i.e., the pairing information), the bastion server 20 and the cloud-based authorization server 30 can communicate with or establish a connection with the particular remote instrument according to the pairing information. In addition, the bastion server is preferably a server with a firewall functionality.

The cloud-based authorization server 30 is coupled to the bastion server 20 and is configured to generate a specific level of speed license at the start of any one of the reserved time periods according to the reservation information, the pairing information, and the instrument information, and transmit the specific level of speed license through the bastion server 20 to the designated remote instrument, to activate the functionality of the testing module thereof and to give the designated remote instrument the specific level testing speed. In other words, the remote instrument can test the product at a specific testing speed based on the testing item.

Figure 2:
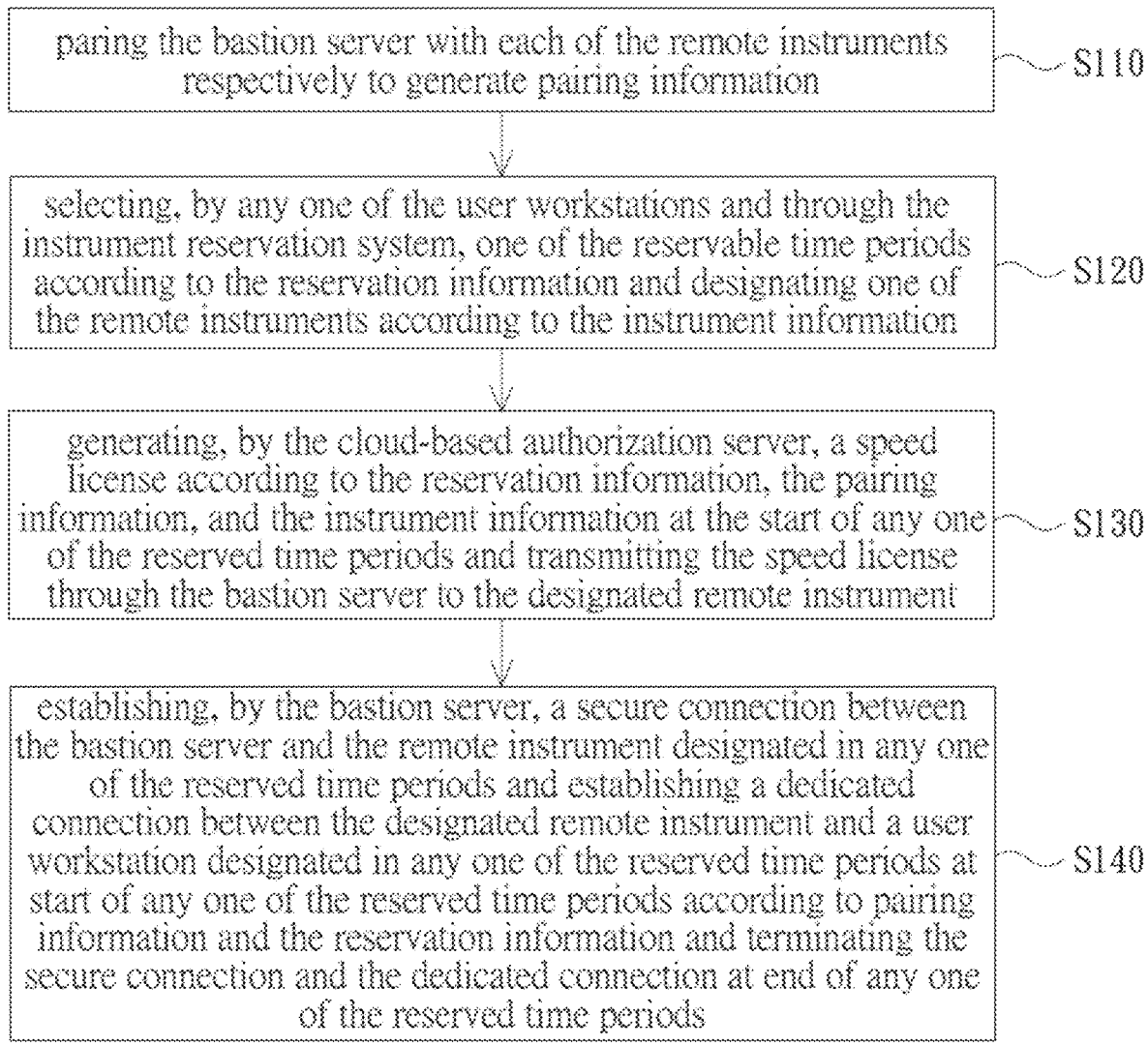
FIG. 2 is a schematic diagram of a method for reserving a cloud-based instrument provided by an embodiment of the present invention.

Referring to FIG. 2, FIG. 2 is a schematic diagram of a method for reserving a cloud-based instrument provided by an embodiment of the present invention. The method for reserving a cloud-based instrument includes the following steps: firstly, as shown in step S110, paring the bastion server 20 with each of the remote instruments 40-1 to 40-M respectively to generate pairing information.

Next, as shown in step S120, selecting, by any one of the user workstations 50-1 to 50-N and through the instrument reservation system 10, one of the plurality of reservable time periods according to the reservation information and selecting and designating one of the remote instruments 40-1 to 40-M (i.e., the remote instrument that is not selected or reserved by other user workstations in this reservable time period) according to the instrument information to complete the reservation process. At the same time, the instrument reservation system 10 synchronously updates the reservation information and the instrument information, that is, updates the reservable time period selected by any one of the user workstations as the reserved time period and updates the selected remote instrument as the remote instrument designated in this reserved time period.

Then, as shown in step S130, generating, by the cloud-based authorization server 30, a speed license at the start of any one of the reserved time periods according to the reservation information, the pairing information, and the instrument information, and transmitting the speed license through the bastion server 20 to the designated remote instrument, thereby activating the functionality of the testing module thereof and to give the designated remote instrument the specific level testing speed.

Thereafter, as shown in step S140, establishing, by the bastion server 20, a secure connection between the bastion server 20 and the remote instrument designated in any one of the reserved time periods and establishing a dedicated connection between the designated remote instrument and the user workstation designated in any one of the reserved time periods according to the pairing information and the reservation information at the start of any one of the reserved time periods, and terminating the secure connection and the dedicated connection at the end of any one of the reserved time periods, thereby ensuring the security and exclusivity (i.e., proprietary) of testing the product.

In summary, for the system and method for reserving the cloud-based instrument provided by an embodiment of the present invention, the remote instrument and the time period that meet the product testing requirements are found, reserved, and selected by the user workstation through the instrument reservation system. The dedicated connection between the user workstation and the designated remote instrument is established at the start of any one of the reserved time periods through the bastion server, the pairing information, and the reservation information. The specific speed license is generated and transmitted to the designated remote instrument at the start of any one of the reserved time periods through the cloud-based authorization server, the instrument information, and the reservation information. The dedicated connection is then terminated through the bastion server at the end of any one of the reserved time periods. Thus, the location and time required to find a remote instrument that meets the product testing requirements are greatly reduced. The security and exclusivity of a testing environment are ensured, while the convenience of testing a product is enhanced and the time for product launching is accelerated.

The above is only a preferred embodiment of the present invention, and is not a limitation of the present invention in any form. Although the present invention is disclosed as described above, in a preferred embodiment, the preferred embodiment is not used to limit the present invention. Some changes or modifications may be made into the equivalent embodiments of equivalent changes utilizing the method and technical content disclosed above by a person skilled in the art without departing from the scope of the technical solution of the present invention. However, any simple amendment, equivalent change, or modification of the above embodiment made based on the technical substance of the present invention without departing from the content of the technical solution of the present invention still belongs to the scope of the technical solution of the present invention.

What is claimed is:

1. A system for reserving a cloud-based instrument, comprising:
    a group of remote instruments, comprising a plurality of remote instruments;
    an instrument reservation system, configured to provide reservation information and instrument information, wherein the reservation information comprises a plurality of reservable time periods and a plurality of reserved time periods, and each of the reserved time periods corresponds to one of the remote instruments;
    a bastion server, coupled to the group of remote instruments and configured to be paired with each of the remote instruments to generate pairing information;
    a group of user workstations, coupled to the bastion server and the instrument reservation system, wherein the group of user workstations comprises a plurality of user workstations, any one of the user workstations selects one of the reservable time periods according to the reservation information and designates one of the remote instruments according to the instrument information through the instrument reservation system; and
    a cloud-based authorization server, coupled to the bastion server and configured to generate a speed license at start of any one of the reserved time periods according to the reservation information, the pairing information, and the instrument information, and transmit the speed license through the bastion server to the remote instrument designated in any one of the reserved time periods;
    wherein one or more of the plurality of user workstations are configured to select, through the instrument reservation system, one of the reservable time periods according to the reservation information, and designate one of the remote instruments according to the instrument information;
    wherein the cloud-based authorization server is configured to generate a speed license according to the reservation information, the pairing information, and the instrument information at the start of any one of the reserved time periods and transmit the speed license through the bastion server to the designated remote instrument; and
    wherein the bastion server is configured to establish a secure connection between the bastion server and the remote instrument designated in any one of the reserved time periods, establish a dedicated connection between the designated remote instrument and a user workstation designated in any one of the reserved time periods at a start of any one of the reserved time periods according to the pairing information and the reservation information, and terminate the secure connection and the dedicated connection at end of any one of the reserved time periods.

2. The system for reserving the cloud-based instrument according to claim 1, wherein the bastion server comprises a plurality of sub-bastion servers, corresponding to the remote instruments, respectively.

3. The system for reserving the cloud-based instrument according to claim 1, wherein the instrument information comprises a testing item and a maximum testing speed for each of the remote instruments.

4. The system for reserving the cloud-based instrument according to any one of claims 1 to 3, wherein the pairing information comprises an identifier and a pairing password of each of the remote instruments.

5. A method for reserving a cloud-based instrument applied to a system for reserving a cloud-based instrument, wherein the system for reserving the cloud-based instrument comprises a group of remote instruments with a plurality of remote instruments, an instrument reservation system, a bastion server, a group of user workstations with a plurality of user workstations, and a cloud-based authorization server, wherein the instrument reservation system is configured to provide reservation information and instrument information, the reservation information comprises a plurality of reservable time periods and a plurality of reserved time periods, each of the reserved time periods designates one of the remote instruments, and the method for reserving the cloud-based instrument comprises steps of:
    pairing the bastion server with each of the remote instruments respectively to generate pairing information;
    selecting, by any one of the user workstations and through the instrument reservation system, one of the reservable time periods according to the reservation information and designating one of the remote instruments according to the instrument information;
    generating, by the cloud-based authorization server, a speed license according to the reservation information, the pairing information, and the instrument information at the start of any one of the reserved time periods and transmitting the speed license through the bastion server to the designated remote instrument; and establishing, by the bastion server, a secure connection between the bastion server and the remote instrument designated in any one of the reserved time periods, establishing a dedicated connection between the designated remote instrument and a user workstation designated in any one of the reserved time periods at a start of any one of the reserved time periods according to the pairing information and the reservation information, and terminating the secure connection and the dedicated connection at end of any one of the reserved time periods.

6. The method for reserving the cloud-based instrument according to claim 5, wherein the speed license is configured to activate the designated remote instrument at the start of any one of the reserved time periods and to give the designated remote instrument a specific level testing speed.

7. The method for reserving the cloud-based instrument according to claim 5, wherein the instrument information comprises a testing item and a maximum testing speed for each of the remote instruments.

8. The method for reserving the cloud-based instrument according to claim 5, wherein the pairing information comprises an identifier and a pairing password of each of the remote instruments.

* * * * *